United States Patent
Sano

(10) Patent No.: US 7,181,656 B2
(45) Date of Patent: Feb. 20, 2007

(54) DEVICE CONNECTED TO IEEE 1394 SERIAL BUS

(75) Inventor: Katsuyoshi Sano, Daito (JP)

(73) Assignee: Funai Electric Co., Ltd., Daito (JP)

( * ) Notice: Subject to any disclaimer, the term of this patent is extended or adjusted under 35 U.S.C. 154(b) by 477 days.

(21) Appl. No.: 10/864,433

(22) Filed: Jun. 10, 2004

(65) Prior Publication Data

US 2004/0268180 A1    Dec. 30, 2004

(30) Foreign Application Priority Data

Jun. 11, 2003    (JP)    ............... 2003-165893

(51) Int. Cl.
*G06F 11/00*    (2006.01)
(52) U.S. Cl. .................... 714/57; 714/46; 714/48; 340/815.45
(58) Field of Classification Search .............. 714/57, 714/46, 48
See application file for complete search history.

(56) References Cited

U.S. PATENT DOCUMENTS

| | | | |
|---|---|---|---|
| 5,644,707 A * | 7/1997 | Chen ........................... 714/57 |
| 6,202,103 B1 * | 3/2001 | Vonbank et al. ............... 710/15 |
| 6,772,956 B1 * | 8/2004 | Leaming ...................... 235/492 |
| 2005/0206528 A1 * | 9/2005 | Hsieh .................... 340/815.45 |
| 2005/0213693 A1 * | 9/2005 | Page ........................... 375/354 |

FOREIGN PATENT DOCUMENTS

JP    2000-184006    6/2000

* cited by examiner

*Primary Examiner*—Robert Beausoliel
*Assistant Examiner*—Marc Duncan
(74) *Attorney, Agent, or Firm*—Crowell & Moring LLP

(57) ABSTRACT

A device connected to an IEEE1394 serial bus, having a first LED that lights up when digital signals are being exchanged between a PHY chip and a LINK chip, and a second LED that lights up when digital signals are being exchanged between the LINK chip and the main processor. The user can thereby be informed as to where a fault has occurred in the pathway from the main processor of itself to another connected device.

3 Claims, 2 Drawing Sheets

DEVICE CONNECTED TO IEEE 1394 SERIAL BUS

BACKGROUND OF THE INVENTION

1. Field of the Invention

The present invention relates to a device connected to an IEEE1394 serial bus.

2. Description of the Related Art

Conventionally, in a device connected to an IEEE1394 serial bus, a display panel or the like is lighted to show that data is being transmitted when stream data (content data) or other digital data is sent to other devices or received from other devices. Therefore, the user can know that a communication fault has occurred at a location in the pathway from the main processor of the device up to another connected device by checking the lighting of the display panel or the like when the device receives data from the other connected device.

In a conventional device connected to an IEEE1394 serial bus as described above, the user can be informed that a communication fault has occurred at a location in the pathway from the main processor of the device up to another connected device when the device receives data from the other connected device, but there is a drawback in that the user cannot be informed of where a fault has occurred in the pathway from the main processor of the device to another connected device.

SUMMARY OF THE INVENTION

An object of the present invention is to provide a device connected to an IEEE1394 serial bus that is capable of informing the user of where a fault has occurred in the pathway from the main processor of itself to another connected device when data is exchanged between itself and another connected device.

The device connected to an IEEE1394 serial bus in accordance with one aspect of the invention comprises a main processor for controlling the entire device; a port for connecting an IEEE1394 serial bus cable; a PHY chip for providing communication function on the physical layer level when exchanging digital signals with another connected device via the IEEE1394 serial bus cable; a LINK chip having an interface function between the PHY chip and the main processor, and providing communication function on the link layer level when exchanging digital signals with the other connected device; and display means that lights up when digital signals transmitted from the other connected device are being received.

The display device switches the display pattern between when a digital signal transmitted from the other connected device has reached the main processor, and when a digital signal transmitted from the other connected device has reached the PHY chip but has not reached the main processor.

In the above-described configuration, one display pattern has been displayed by the display device when a digital signal transmitted from the other device has reached the PHY chip but has not reached the main processor. Thus, the user can know that a fault has not occurred in the pathway from the other device up to immediately before the PHY chip of the device itself or in the PHY chip of the device itself, but that there is a high possibility that a fault has occurred in the main processor of the device itself or in the LINK chip of the device itself located in the pathway thereafter. Furthermore, another display pattern is displayed by the display device when the digital signal transmitted from the other device has reached the main processor of the device itself. Thus, the user can know that a fault has not occurred anywhere in the pathway from the main processor of the device itself to the other connected device, and that the device itself and the other connected device are operating normally.

The display means preferably has first display means that lights up when the PHY chip is receiving digital signals from the other connected device, and second display means that lights up when the main processor is receiving digital signals from the LINK chip.

More preferably, the number of ports is two or more. The display means has a first LED (Light Emitting Diode) that lights up when digital signals are being exchanged between the PHY chip and the LINK chip; a signal detecting circuit that is disposed between the PHY chip and the LINK chip, does not supply voltage to the first LED when digital signals are not being exchanged between the PHY chip and the LINK chip, and detects digital signals and supplies voltage to the first LED when the digital signals are being exchanged between the PHY chip and the LINK chip; and a second LED that lights up when digitals signals are being exchanged between the LINK chip and the main processor. The main processor does not supply voltage to the second LED when digital signals are not being exchanged between itself and the LINK chip, and supplies voltage to the second LED when digital signals are being exchanged between itself and the LINK chip.

In the above-described configuration, the user can be informed where a fault has occurred in the pathway from another connected device to the main processor (of the device itself) when data is exchanged between the device itself and the other connected device with the aid of the first LED that lights up when digital signals are being exchanged between the PHY chip and the LINK chip, and the second LED that lights up when digitals signals are being exchanged between the LINK chip and the main processor.

More specifically, when digital signals are received from a device connected to a certain port out of the two or more ports, and a fault occurs in the pathway from another device connected a certain port up to the LINK chip (of the device itself), the signal detecting circuit does not supply voltage to the first LED, so the first LED does not light up. Therefore, if the first LED is not lighted when digital signals are received from a device connected to the certain port, the user can know that a fault has occurred in the pathway from the device connected to the certain port up to immediately before the LINK chip (of the device itself). Also, when the first LED is not lighted, which can occur not only when digital signals are received from the device connected to the certain port, but also when digital signals are received from a device connected to another port, the user can know there is a high possibility that a fault has occurred in the PHY chip (of the device itself) that is used in common when digital signals are received from these connected devices. On the other hand, if the first LED is lighted when digital signals are received from the device connected to the other port, the user can know that there is a high possibility that a fault has occurred not in the PHY chip but in the certain port, in the device connected to the certain port, or in the IEEE1394 serial bus cable that connects these.

When digital signals are received from the other connected device, and a fault has occurred at a location in the pathway from the other connected device up to the main processor (of the device itself), the main processor (of the device itself) does not supply voltage to the second LED, so the second LED does not light up. Therefore, if the second LED is not lighted when digital signals are received from the other connected device, the user can know that a fault has occurred at a location in the pathway from the other device up to the main processor (of the device itself). Also, if the first LED is lighted but the second LED is not lighted, the user can know that a fault has not occurred in the pathway from the other device to just before arriving the LINK chip (of the device itself) because of the lighting of the first LED, and that there is a high possibility that a fault has occurred in the LINK chip (of the device itself) or in the main processor (of the device itself) that is present in the pathway thereafter. Furthermore, if both the first LED and the second LED are lighted, the user can know that a fault has not occurred anywhere in the pathway from the other connected device to the main processor (of the device itself), and that the host machine and the other connected device are operating normally.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
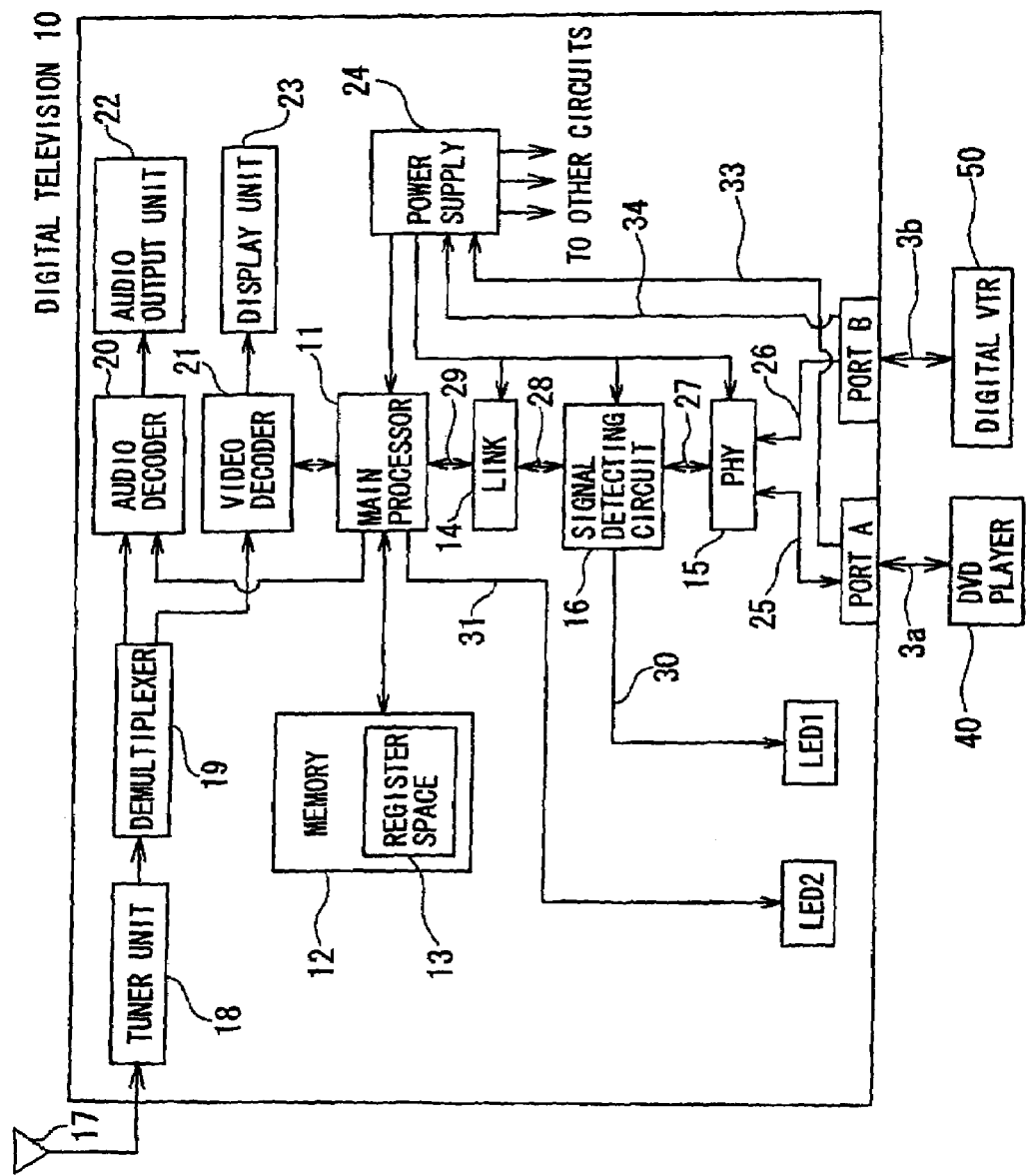
FIG. 1 is an electrical block diagram of a digital television (device connected to a serial bus) according to an embodiment of the present invention.

An embodiment exemplifying the present invention is described below with reference to the diagrams. A device connected to the IEEE1394 serial bus in accordance with the present embodiment is a digital television that can be connected to an IEEE1394 serial bus (hereinafter abbreviated to "bus"). FIG. 1 is the electrical block diagram of this digital television. This digital television 10 is connected to a DVD (Digital Versatile Disc) player 40 and a digital VTR (Video Tape Recorder) 50 via IEEE1394 serial bus cables (hereinafter abbreviated to "bus cable") 3a and 3b, and has a main processor 11 for controlling the entire device and a memory 12 for storing various types of data. The main processor 11 also provides the application layer function in the IEEE1394 protocol. Also, the memory 12 includes a register space 13 in which connection information or the like for the digital television 10 itself and other connected devices is stored. Also, the digital television 10 has a LINK chip 14, a PHY chip 15, and ports A and B for connecting to the bus cables 3a and 3b. The LINK chip 14 has an interface function between the PHY chip 15 and the main processor 11, and provides a communication function on the link layer level in the IEEE1394 protocol when digital signals are exchanged between the digital television 10 and the other connected devices. Also, the PHY chip 15 provides a communication function on the physical layer level in the IEEE1394 protocol when digital signals are exchanged between the digital television 10 and the other connected devices.

The digital television 10 also has a signal detecting circuit 16 disposed between the PHY chip 15 and the LINK chip 14, and an LED (Light Emitting Diode) 1 (first LED, in the claims) that lights when digital signals are being exchanged between the PHY chip 15 and the LINK chip 14. The signal detecting circuit 16 does not supply voltage to LED 1 when digital signals are not being exchanged between the PHY chip 15 and the LINK chip 14, and detects digital signals when such signals are being exchanged between the PHY chip 15 and the LINK chip 14, and supplies voltage to LED 1 via a line 30.

Furthermore, the digital television 10 has an LED 2 (second LED, in the claims) that lights when digital signals are being exchanged between the LINK chip 14 and the main processor 11. The main processor 11 does not supply voltage to LED 2 when digital signals are not being exchanged with the LINK chip 14, and supplies voltage to LED 2 via a line 31 when digital signals are being exchanged between the main processor 11 and the LINK chip 14.

The digital television 10 has a power supply 24, and the main processor 11, LINK chip 14, PHY chip 15, signal detecting circuit 16, and other circuits within the device are supplied with power by this power supply 24. When power supplied by the power supply 24 is insufficient, power is supplied by the DVD player 40 or digital VTR 50, which is another device connected on the bus, by way of lines 33 and 34, port A and port B, and bus cables 3a and 3b.

Furthermore, the digital television 10 has a tuner unit 18, a demultiplexer 19, an audio decoder 20, a video decoder 21, an audio output unit 22, and a display unit 23. The tuner 18 demodulates digital data received by the antenna 17, performs error correction, and the like, and outputs transport stream (TS) data. The demultiplexer 19 extracts the desired audio and video data from the TS data, outputs the extracted audio data to the audio decoder 20, and outputs the extracted video data to the video decoder 21. The audio decoder 20 decodes the audio data received from the demultiplexer 19, or the audio data received from the DVD player 40 or the digital VTR 50, which is the other connected device, by way of the bus cables 3a and 3b, and sends the output to the audio output unit 22. The video decoder 21 decodes the video data received from the demultiplexer 19, or the video data received from the DVD player 40 or the digital VTR 50, which is the other connected device, by way of the bus cables 3a and 3b, and sends the output to the display unit 23.

Figure 2:
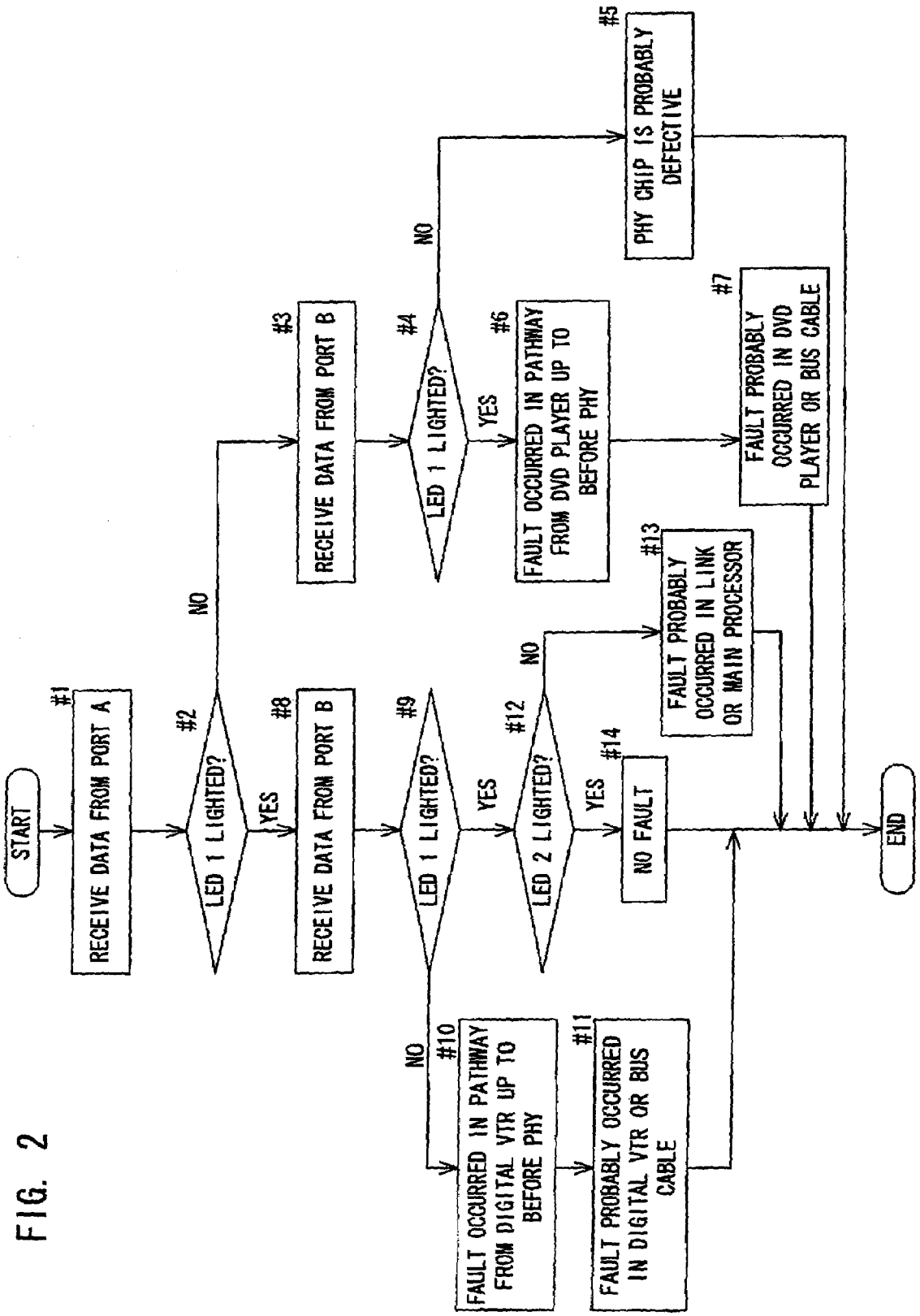
FIG. 2 is a flowchart showing a method for finding the occurrence locations of communication-related faults with the aid of the two LEDs in FIG. 1.

Next, the method whereby the location in which a communication-related fault has occurred can be found using the above-described LED 1 and LED 2 is described with reference to the flowchart in FIG. 2. First, when stream data is being received (S1) from the DVD player 40 connected to port A, the user checks (S2) whether the LED 1 is lighted. The user can thereby know whether a fault has occurred at a location (any one of the DVD player 40, the bus cable 3a, the port A, the line 25, the PHY chip 15, the line 27, and the signal detecting circuit 16 in FIG. 1) in the pathway from the DVD player 40 up to immediately before the LINK chip 14. When the LED 1 is not lighted (NO, in S2), the user checks (S4) that the LED 1 is not lighted during reception (S3) of stream data from the digital VTR 50 connected to port B. As a result, when the LED 1 is not lighted (NO, in S4) during reception of stream data from the digital VTR 50, the user can know (S5) that there is a high possibility that a fault has occurred in the PHY chip 15 that is used in common during reception of stream data from the DVD player 40 and digital VTR 50. On the other hand, when the LED 1 is lighted (YES, in S4) during reception of stream data from the digital VTR 50, the user can know that a fault has occurred (S6) in the pathway from the DVD player 40 up to immediately before the PHY chip 15, rather than in the PHY chip 15 itself, and that there is a high possibility that a fault has occurred (S7) in the DVD player 40 or bus cable 3a.

When the LED 1 is lighted (YES, in S2) during reception (S1) of stream data from the DVD player 40 shown in S1, the user checks (S9) whether LED 1 lights during reception (S8) of stream data from the digital VTR 50 connected to port B. When the LED 1 is not lighted (NO, in S9) during reception of stream data from the digital VTR 50, the user can know that a fault has occurred (S10) in the pathway from the digital VTR 50 up to immediately before the PHY chip 15, rather than in the PHY chip 15 itself, and that there is a high possibility that a fault has occurred (S11) in the digital VTR 50 or bus cable 3b.

When the LED 1 is lighted (YES, in S9) in the determination process in S9, the user checks (S12) whether the LED 2 is lighted during the reception of stream data shown in S1 and S8. When the LED 2 is not lighted (NO, in S12), the user can know that because LED 1 is lighted, a fault has not occurred in the pathway from the DVD player 40 or the digital VTR 50 to the signal detecting circuit 16, and that there is a high possibility that a fault has occurred (S13) in the main processor 11 or LINK chip 14 located in the pathway thereafter.

When the LED 2 is lighted (YES, in S12) in the determination process in S12, the user can know that a fault has not occurred (S14) anywhere in the pathway from the DVD player 40 and digital VTR 50 to the main processor 11 on the digital television 10 side, and that the digital television 10, the DVD player 40 and the digital VTR 50 are operating normally.

As described above, in the digital television 10 in accordance with the present embodiment, the LED 1 is lighted solely when stream data is being exchanged between the PHY chip 15 and the LINK chip 14, and the LED 1 is not lighted when stream data is not being exchanged between the PHY chip 15 and the LINK chip 14. Also, the LED 2 is lighted solely when stream data is being exchanged between the LINK chip 14 and the main processor 11, and the LED 2 is not lighted when stream data is not being exchanged between the LINK chip 14 and the main processor 11. The user can thereby be informed as to where a fault has occurred in the pathway from the main processor 11 of one connected device (digital television 10) to another connected device (DVD player 40 or digital VTR 50).

The present invention is not limited to the above-described embodiment, and various modifications are possible. For example, in the present embodiment, two display devices LED 1 and LED 2 were used to inform the user as to where a fault has occurred in the pathway from the main processor 11 of the digital television 10 to other connected devices, but these may be brought together in one display device, and the display pattern may be switched with the display device between cases in which the stream data transmitted from other connected devices has reached the main processor 11, and cases in which the stream data has reached the PHY chip 15 but has not reached the main processor 11. Also, in the embodiment described above, an LED was used as the display device, but other light-emitting elements may also be used. Furthermore, the above-described embodiment was described with reference to an example of a digital television 10 in which devices connected to a serial bus could be connected to an IEEE1394 serial bus, but connected devices to which the present invention can be applied are not limited to this arrangement alone, and devices that can be connected to a serial bus other than an IEEE1394 serial bus, such as a USB (Universal Serial Bus), may also be used.

What is claimed is:

1. A device connected to an IEEE1394 serial bus comprising:
   a main processor for controlling the entire device,
   a port for connecting an IEEE1394 serial bus cable,
   a PHY chip for providing communication function on the physical layer level when exchanging digital signals with another connected device via the IEEE1394 serial bus cable,
   a LINK chip having an interface function between the PHY chip and the main processor, and providing communication function on the link layer level when exchanging digital signals with the other connected device, and
   display means that lights up when digital signals transmitted from the other connected device are being received; wherein
   the display means switches the display pattern between when a digital signal transmitted from the other connected device has reached the main processor, and when a digital signal transmitted from the other connected device has reached the PHY chip but has not reached the main processor.

2. The device connected to an IEEE1394 serial bus according to claim 1, wherein the display means has first display means that lights up when the PHY chip is receiving digital signals from the other connected device, and second display means that lights up when the main processor is receiving digital signals from the LINK chip.

3. The device connected to an IEEE1394 serial bus according to claim 1, wherein
   the number of ports is two or more;
   the display means has
   a first LED (Light Emitting Diode) that lights up when digital signals are being exchanged between the PHY chip and the LINK chip,
   a signal detecting circuit that is disposed between the PHY chip and the LINK chip, does not supply voltage to the first LED when digital signals are not being exchanged between the PHY chip and the LINK chip, and detects these digital signals and supplies voltage to the first LED when digital signals are being exchanged between the PHY chip and the LINK chip, and
   a second LED that lights up when digital signals are being exchanged between the LINK chip and the main processor; and
   the main processor does not supply voltage to the second LED when digital signals are not being exchanged between itself and the LINK chip, and supplies voltage to the second LED when digital signals are being exchanged between itself and the LINK chip.

* * * * *